(12) United States Patent
Gimmler et al.

(10) Patent No.: US 9,955,720 B2
(45) Date of Patent: *May 1, 2018

(54) APPARATUS AND METHOD FOR CURLED EXTRUDATE

(71) Applicant: Kellogg Company, Battle Creek, MI (US)

(72) Inventors: Norbert Gimmler, Portage, MI (US); Charles A. Smith, Marshall, MI (US); Chris Willoughby, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/974,264

(22) Filed: Dec. 18, 2015

(65) Prior Publication Data

US 2016/0100623 A1 Apr. 14, 2016

Related U.S. Application Data

(60) Continuation of application No. 13/046,962, filed on Mar. 14, 2011, now Pat. No. 9,247,752, which is a
(Continued)

(51) Int. Cl.
*A23P 1/12* (2006.01)
*A21C 11/10* (2006.01)
(Continued)

(52) U.S. Cl.
CPC .............. *A23P 1/12* (2013.01); *A21C 11/103* (2013.01); *A21C 11/16* (2013.01); *A21C 11/163* (2013.01);
(Continued)

(58) Field of Classification Search
CPC ....... A21C 11/10; A21C 11/103; A21C 11/16; A21C 11/22; A21C 3/04; A21C 3/08;
(Continued)

(56) References Cited

U.S. PATENT DOCUMENTS 1,804,296 A * 5/1931 Winkler ................. A21C 11/14
426/502
2,149,066 A 2/1939 Orsini
(Continued)

FOREIGN PATENT DOCUMENTS

EP 1157613 11/2001
WO 03022549 3/2003
WO 2008021798 2/2008

OTHER PUBLICATIONS

PCT/US2011/028306 International Search Report dated Jan. 2, 2012.

*Primary Examiner* — Seyed Masoud Malekzadeh
(74) *Attorney, Agent, or Firm* — Honigman Miller Schwartz and Cohn LLP; Kathryn D. Doyle, Esq.; Jonathan P. O'Brien

(57) ABSTRACT

A shaping assembly for producing a discrete spiral shaped food product includes a die that defines at least one aperture that is centered on an aperture axis. The at least one aperture extends to an aperture exit and allows for the movement of a stream of food mass through the aperture and out the aperture exit. A shaping tool includes at least one slicing blade that is disposed over at least a portion of the aperture exit to slice the stream of food mass into a plurality of food mass portions. A coupling arrangement engages the shaping tool to facilitate rotation of the slicing blade to spin the plurality of food mass portions into a spiral shaped stream of food mass. The slicing blade simultaneously slices and spins the stream of food mass to create the spiral shaped stream of
(Continued)

food mass. A crimper is used to cut the spiral shaped stream of food mass into the discrete spiral shaped food products.

22 Claims, 7 Drawing Sheets

Related U.S. Application Data continuation-in-part of application No. 12/978,705, filed on Dec. 27, 2010, now Pat. No. 9,113,657, which is a division of application No. 11/834,362, filed on Aug. 6, 2007, now Pat. No. 7,883,735.

(60) Provisional application No. 60/821,628, filed on Aug. 7, 2006.

(51) Int. Cl.

| | | |
|---|---|---|
| *A21C 11/16* | (2006.01) | |
| *A23P 30/20* | (2016.01) | |
| *A23P 30/25* | (2016.01) | |
| *A21C 3/04* | (2006.01) | |
| *A21C 3/08* | (2006.01) | |
| *A21C 11/22* | (2006.01) | |
| *B29C 47/00* | (2006.01) | |
| *B29C 47/30* | (2006.01) | |
| *B29L 31/06* | (2006.01) | |

(52) U.S. Cl.
CPC ............... *A23P 30/20* (2016.08); *A23P 30/25* (2016.08); *A21C 3/04* (2013.01); *A21C 3/08* (2013.01); *A21C 11/10* (2013.01); *A21C 11/22* (2013.01); *B29C 47/0011* (2013.01); *B29C 47/0014* (2013.01); *B29C 47/0016* (2013.01); *B29C 47/0033* (2013.01); *B29C 47/0035* (2013.01); *B29C 47/0066* (2013.01); *B29C 47/30* (2013.01); *B29C 2793/009* (2013.01); *B29C 2793/0081* (2013.01); *B29L 2031/06* (2013.01)

(58) Field of Classification Search
CPC .......... A21C 11/163; A23P 1/12; A23P 1/125; A23P 30/20; A23P 30/25; A23L 1/0076
USPC ....... 426/625, 448, 449, 450, 500, 516, 518; 425/301, 307, 309, 465, 466
See application file for complete search history.

(56) References Cited

U.S. PATENT DOCUMENTS

| | | | |
|---|---|---|---|
| 2,677,335 A | 5/1954 | Maldari | |
| 2,738,549 A | 3/1956 | Pazitney, Jr. et al. | |
| 2,793,598 A | 5/1957 | Rivoche | |
| 3,256,563 A | 6/1966 | Criss et al. | |
| 3,351,026 A * | 11/1967 | Hayashi | A21C 11/00 425/306 |
| 3,387,069 A | 6/1968 | Stohr | |
| 3,767,338 A | 10/1973 | Soderlund | |
| 3,861,844 A | 1/1975 | Miller | |
| 3,876,743 A | 4/1975 | Soderlund | |
| 4,025,260 A * | 5/1977 | Neel | A21C 11/163 425/131.1 |
| 4,445,838 A | 5/1984 | Groff | |
| 4,486,163 A | 12/1984 | Pfeilstetter | |
| 4,504,511 A * | 3/1985 | Binley | A21C 3/08 264/209.2 |
| 4,589,833 A * | 5/1986 | Hayashi | A21C 11/10 264/141 |
| 4,636,158 A * | 1/1987 | Huang | A21C 9/06 425/133.1 |
| 4,752,205 A | 6/1988 | Moriyama et al. | |
| 4,767,304 A | 8/1988 | Tashiro | |
| 4,767,305 A | 8/1988 | Tashiro | |
| 4,802,838 A | 2/1989 | Schaaf | |
| 4,900,572 A | 2/1990 | Repholz et al. | |
| 4,936,203 A * | 6/1990 | Aoki | A21C 9/08 198/629 |
| 5,211,965 A | 5/1993 | Kitagawa | |
| 5,223,277 A | 6/1993 | Watanabe | |
| 5,492,706 A | 2/1996 | Cockings et al. | |
| 5,510,135 A | 4/1996 | Galder | |
| 5,516,272 A | 5/1996 | Cummins | |
| 6,257,863 B1 | 7/2001 | Otte | |
| 6,379,733 B2 | 4/2002 | Matthews et al. | |
| 6,450,796 B1 * | 9/2002 | Groff | A21C 3/04 425/192 R |
| 6,626,660 B1 | 9/2003 | Olson et al. | |
| 6,709,256 B2 | 3/2004 | Tashiro et al. | |
| 6,797,213 B2 | 9/2004 | Bortone et al. | |
| 6,830,444 B2 | 12/2004 | Franke et al. | |
| 6,881,050 B1 | 4/2005 | McIsaac | |
| 7,007,559 B2 | 3/2006 | Klammer | |
| 7,264,461 B2 | 9/2007 | Ouellette | |
| 7,293,974 B2 | 11/2007 | Bortone et al. | |
| 7,648,352 B2 | 1/2010 | Morales-Alvarez et al. | |
| 9,247,752 B2 | 2/2016 | Gimmler et al. | |
| 2002/0017204 A1 | 2/2002 | Tashiro et al. | |
| 2003/0049348 A1 | 3/2003 | Bortone | |
| 2003/0152681 A1 | 8/2003 | Bortone | |
| 2003/0228400 A1 * | 12/2003 | Dahl | A23P 30/25 426/282 |
| 2004/0070103 A1 * | 4/2004 | Bortone | B29C 47/0038 264/143 |
| 2004/0080066 A1 | 4/2004 | Klammer et al. | |
| 2004/0089968 A1 | 5/2004 | Bortone | |
| 2005/0019467 A1 | 1/2005 | Bortone et al. | |
| 2005/0034581 A1 * | 2/2005 | Bortone | A21C 11/10 83/469 |
| 2007/0087070 A1 | 4/2007 | Ouellette | |
| 2010/0074981 A1 | 3/2010 | Morales-Alvarez et al. | |
| 2012/0040078 A1 | 6/2012 | Narwankar et al. | |

* cited by examiner

APPARATUS AND METHOD FOR CURLED EXTRUDATE

CROSS-REFERENCE TO RELATED APPLICATIONS

The present application is a continuation of U.S. application Ser. No. 13/046,962 for an APPARATUS AND METHOD FOR CURLED EXTRUDATE, filed Mar. 14, 2011, now issued as U.S. Pat. No. 9,247,752 which is a continuation-in-part of U.S. application Ser. No. 12/978,705, now U.S. Pat. No. 9,113,657 for an APPARATUS AND METHOD FOR CURLED EXTRUDATE, filed Dec. 27, 2010, which is a divisional of U.S. application Ser. No. 11/834,362, now U.S. Pat. No. 7,883,735 for an APPARATUS AND METHOD FOR CURLED EXTRUDATE, filed Aug. 6, 2007, which claims the benefit of U.S. Provisional Patent Application Ser. No. 60/821,628 for an APPARATUS AND METHOD FOR CURLED EXTRUDATE, filed on Aug. 7, 2006, all of which are hereby incorporated by reference in their entirety.

BACKGROUND OF THE INVENTION

1. Field of the Invention

The invention relates to extruded products and more particularly to processing a stream of product from an extruder to achieve a desired shape.

2. Description of the Related Art

Extruders are used in the preparation of various products, including food products such as ready-to-eat ("R-T-E") cereals. Extruders such as cooker extruders can be desirable because a single machine can produce large quantities of a cooked dough in a short period of time. Such cooker extruders can be used to prepare cooked dough extrudates which can thereafter be formed into individual cereal or snack pieces. The formation of such pieces may involve puffing the pieces to form finished puffed R-T-E cereals. In another variation, the capabilities of the extruder and the characteristics of the cooked cereal dough are such that the dough puffs immediately upon being extruded and is cut into individual puffed pieces at the die head.

SUMMARY OF THE INVENTION

In summary, the invention is an apparatus and method for producing a substantially spiral shaped food product. The apparatus includes a die defining a plurality of apertures disposed in a circle about a center. The apparatus also includes at least one cutting blade disposed for rotation about the center and operable to intermittently pass fully across each of the apertures during rotation. The apparatus also includes a plurality of slicing blades arranged for individual rotation about one of the plurality of apertures. The plurality of slicing blades are also arranged for continuous extension less than fully across the one aperture. The apparatus also includes a planetary coupling arrangement operably disposed to facilitate reciprocating rotation between the at least one cutting blade and the plurality of slicing blades.

The subject invention further provides for a shaping assembly that produces a discrete spiral shaped food product. The shaping assembly includes a die that defines at least one aperture that is centered on an aperture axis. The at least one aperture extends to an aperture exit and allows for the movement of a stream of food mass through the aperture and out the aperture exit. A shaping tool includes at least one slicing blade that is disposed over at least a portion of the aperture exit to slice the stream of food mass into a plurality of food mass portions. A coupling arrangement engages the shaping tool to facilitate rotation of the slicing blade to spin the plurality of food mass portions into a spiral shaped stream of food mass. The slicing blade simultaneously slices and spins the stream of food mass to create the spiral shaped stream of food mass. A crimping apparatus is used to cut the spiral shaped stream of food mass into the discrete spiral shaped food products.

BRIEF DESCRIPTION OF THE DRAWINGS

Applications of the present invention will become apparent to those skilled in the art when the following description of an exemplary embodiment for practicing the invention is read in conjunction with the accompanying drawings.

DETAILED DESCRIPTION OF AN EXEMPLARY EMBODIMENT

Figure 1:
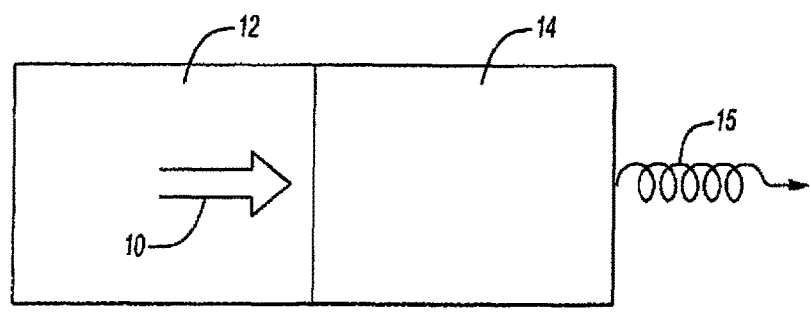
FIG. 1 is a schematic view of an exemplary operating embodiment of the invention.

Referring now to FIG. 1, in an exemplary embodiment of the invention, a food mass 10 is moved through an extruder 12 to a shaping assembly 14 and turned into a helically-shaped food product 15. The food mass 10 is worked by one or more screws in the extruder 12. The food mass 10 is subject to relatively high pressure such that water within the food mass 10 is superheated. The food mass 10 can be formulated such that the resulting discrete food product 15 is a snack piece or a cereal piece or any other kind of edible item.

Figure 2:
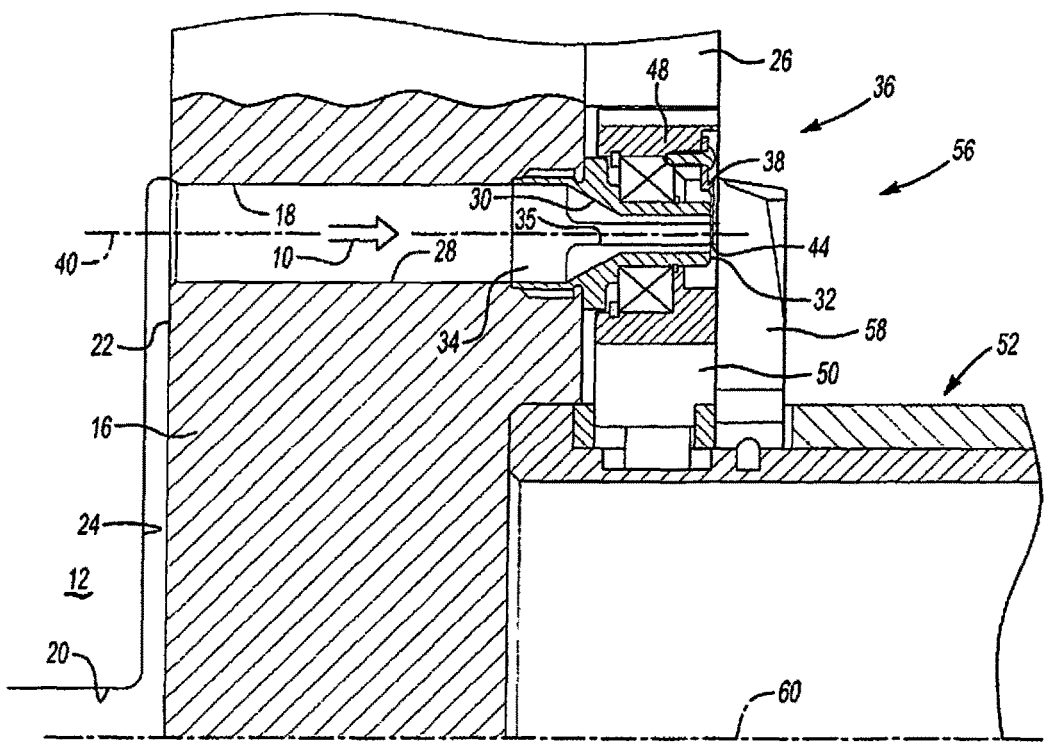
FIG. 2 is a cross-sectional view of a shaping assembly having a shaping tool according to the exemplary embodiment of the invention.

Referring now to FIG. 2, in the exemplary embodiment of a shaping tool, the shaping assembly 14 includes a channeling die plate 16 cooperating with the extruder 12 and forming one or more exit ports 18. An outlet 20 of the extruder 12 opens to a surface 22 of the channeling die plate 16. The food mass 10, still at high pressure, flows along the surface 22 to the one or more exit ports 18. The food mass 10 moves through a channel 24 between the outlet 20 of the extruder 12 and the exit port 18. The channel 24 can be defined by the flat surface 22 and a groove formed in the extruder 12, or by a flat surface of the extruder 12 and a groove in the surface 22, or by an additional plate disposed between the extruder 12 and the channeling die plate 16.

The shaping assembly 14 includes a die that defines at least one aperture 28 that is centered on an aperture axis 40. The at least one aperture 28 extends to an aperture exit 32 and allows for the movement of a stream of food mass 10 through the aperture 28 and out the aperture exit 32. While the die may only define a single aperture 28, the die may define a plurality of apertures 28 that are arrayed about a spindle axis 60, with each of the plurality of apertures 28 being centered on a corresponding aperture axis 40.

In the exemplary embodiment of the invention, the shaping assembly 14 includes a shaping tool supporting plate 26 adjacent to the channeling die plate 16. The plates 16, 26 define apertures 28, 30 aligned and in communication with one another to define the exit port 18. The aperture 30 of the plate 26 narrows with the respect to the aperture 28 prior to an exit 32 of the exit port 18 to increase the pressure of the food mass 10.

In an alternative embodiment of the invention, one or more coloring materials can be added to the food mass 10 prior to the exit 32 to modify the visual appearance of the finished food product 15. Also, one or more substreams of the food mass 10 can be combined to modify the taste, appearance and/or texture of the finished food product 15. In the exemplary embodiment of the invention, an insert 34 is disposed in the exit port 18 to accommodate the addition of two different colors, a first color on the outside of the food product immediately emerging from the exit 32 and a second color on the inside of the food product immediately emerging from the exit 32. The insert 34 includes a shaft portion 35 that is centered and extends along the aperture axis 40 or axis 40 of the exit port 18.

With use of the insert 34, the resultant stream of food mass 10 includes a first food mass that is surrounded by a second food mass as the stream of food mass 10 exits the aperture exit 32. The first and second food masses differ from each other by at least one of color, taste and texture. When two food masses are used, a second extruder 12a may be used to feed the second food mass to the insert 34. The second extruder 12a may include an outlet 20a that feeds the second food mass to the insert 34. The second food mass moves through a channel 24a between the outlet 20a of the extruder 12a and the insert 34.

The food mass 10 exits high pressure conditions at the exit 32. The shaping assembly 14 is disposed adjacent the exit 32 and includes a shaping tool 36 at the exit 32 to induce a spiral or helix shape in the food mass 10 exiting the exit 32. The shaping tool 36 of the exemplary embodiment of the invention includes a blade 38 extending at least partially across the exit 32. The shaping tool 36 rotates about the aperture axis 40 or center axis 40 of the exit 32 as the food mass 10 passes out of the exit 32.

Figure 3:
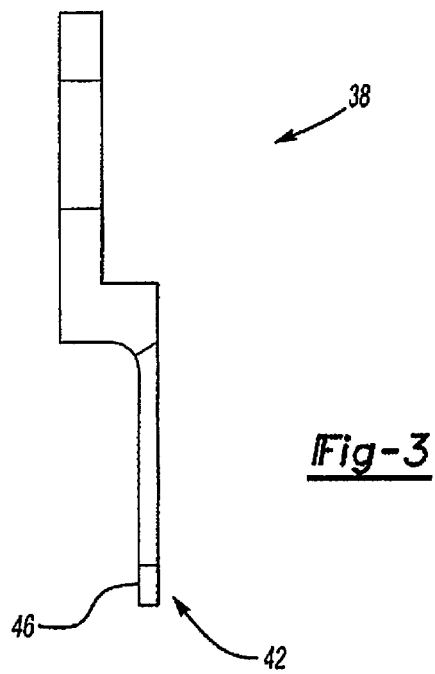
FIG. 3 is left-hand view of a blade of the shaping tool according the exemplary embodiment of the invention.
Figure 4:
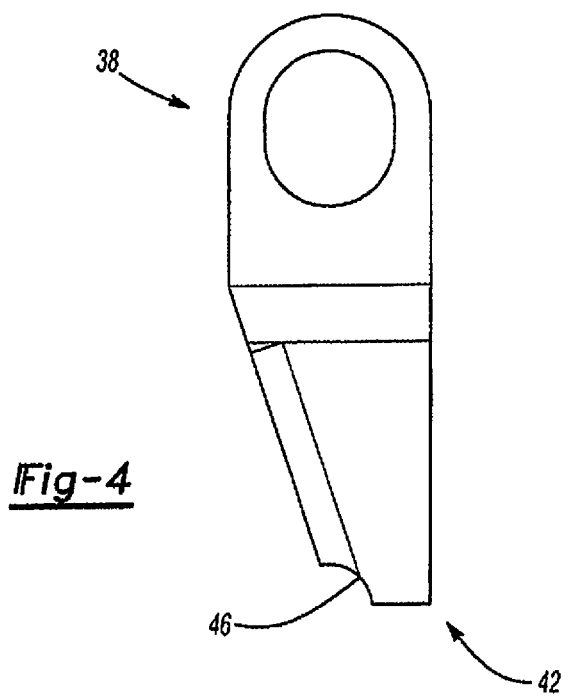
FIG. 4 is a front view of the blade shown in FIG. 3.

In the exemplary embodiment of the invention, the blade 38 extends halfway across the exit 32. A free end or cantilevered end 42 of the blade 38 (shown in FIGS. 3 and 4) is disposed in a groove 44 of the shaft portion 35 to reduce the likelihood of deflection of the blade 38. The groove 44 is annular and extends around the axis 40. The exemplary blade 38 includes a notch 46 shaped to correspond to the shape of the bottom of the groove 44. In one possible alternative embodiment of the invention, a blade could extend fully across the exit 32 in place of the blade 38 that extends partially across the exit 32.

In an alternative embodiment, the shaping tool 36 includes at least one slicing blade 38 that is disposed over at least a portion of the aperture exit 32 to slice the stream of food mass 10 into a plurality of food mass portions. The slicing blade 38 simultaneously slices and spins the stream of food mass 10 to create the spiral shaped stream of food mass 11 exiting the aperture exit 32. A slicing blade 38 has a blade thickness $t_b$ that extends axially along the aperture axis 40 to slice the stream of food mass 10 into the plurality of food mass portions as the stream of food mass 10 exits the aperture exit 32. The thickness of the slicing blade 38 allows for the slicing blade 38 to simultaneously slice and spin the stream of food mass 10 into the spiral shaped stream of food mass 11 that exits the aperture exit 32. In the preferred embodiment, the slicing blade 38 slices the stream of food mass 10 into a plurality of equally sized food mass portions. While a single slicing blade 38 may be used, as seen in FIG. 8, a plurality of slicing blades 38, as seen in FIG. 9, may be used.

Figure 8:
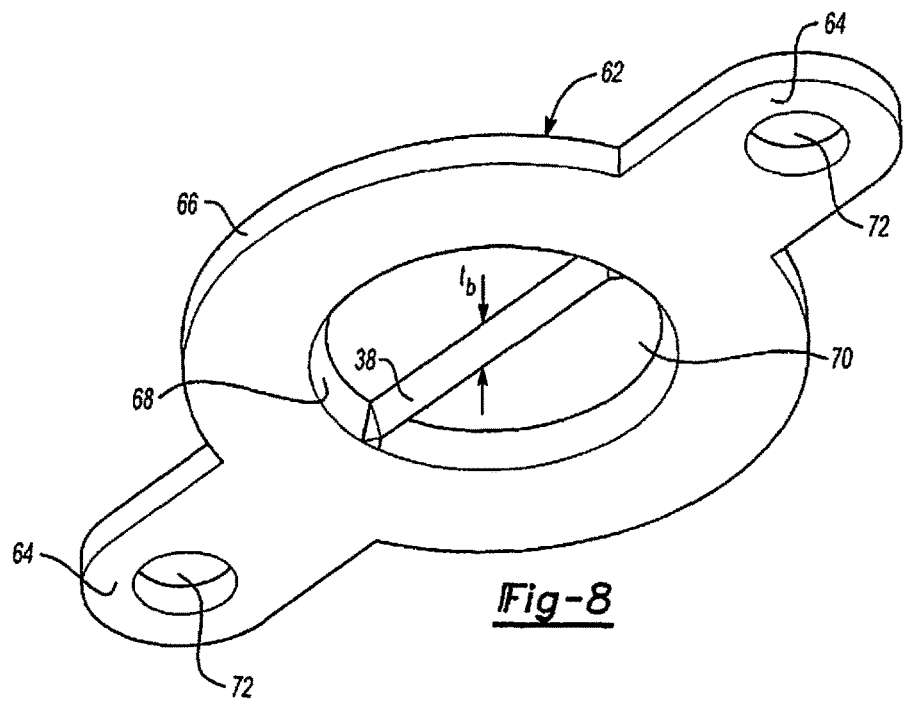
FIG. 8 is a perspective view of a slicing blade according the second exemplary embodiment of the subject invention.
Figure 9:
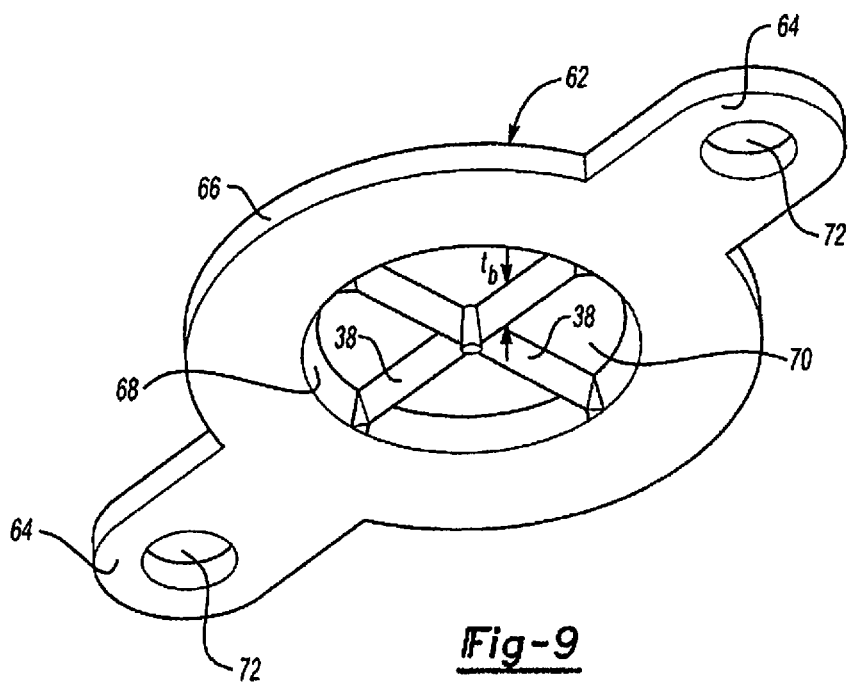
FIG. 9 is a perspective view of a slicing blade according the second exemplary embodiment of the subject invention.
Figure 10:
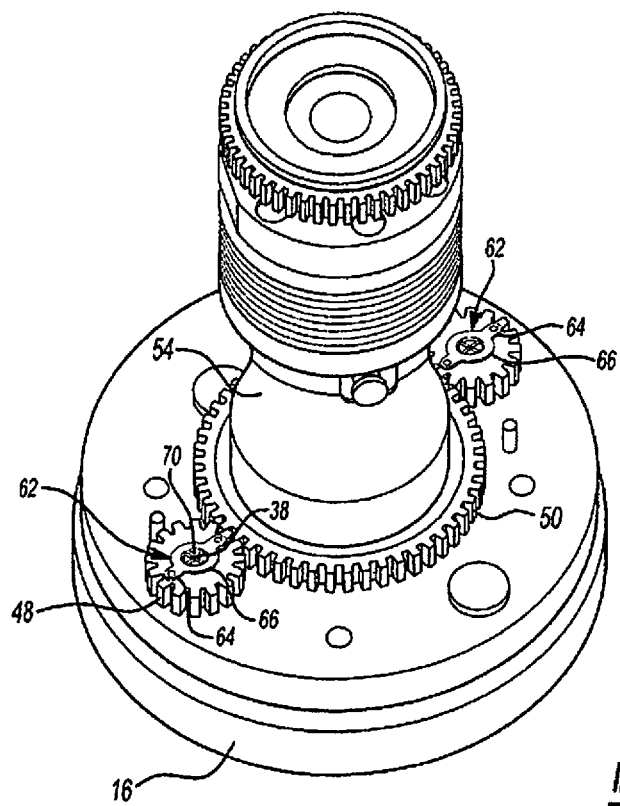
FIG. 10 is a first perspective view of a second exemplary shaping assembly wherein a shaping tool supporting plate has been removed.
Figure 11:
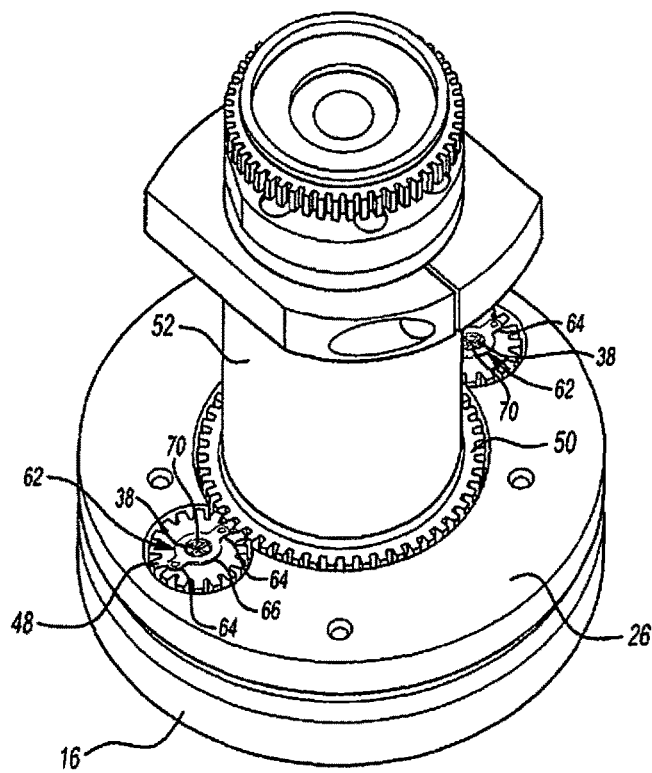
FIG. 11 is a second perspective view of the second exemplary shaping assembly with the shaping tool supporting plate.
Figure 12:
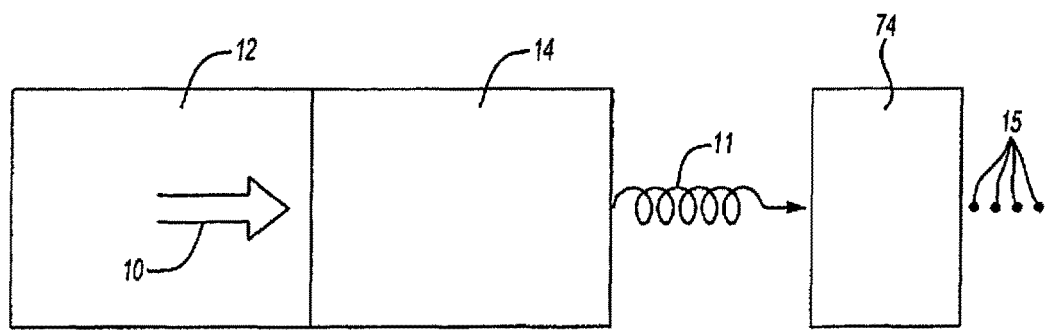
FIG. 12 is a schematic view of a secondary exemplary operating embodiment of the present invention.
Figure 13:
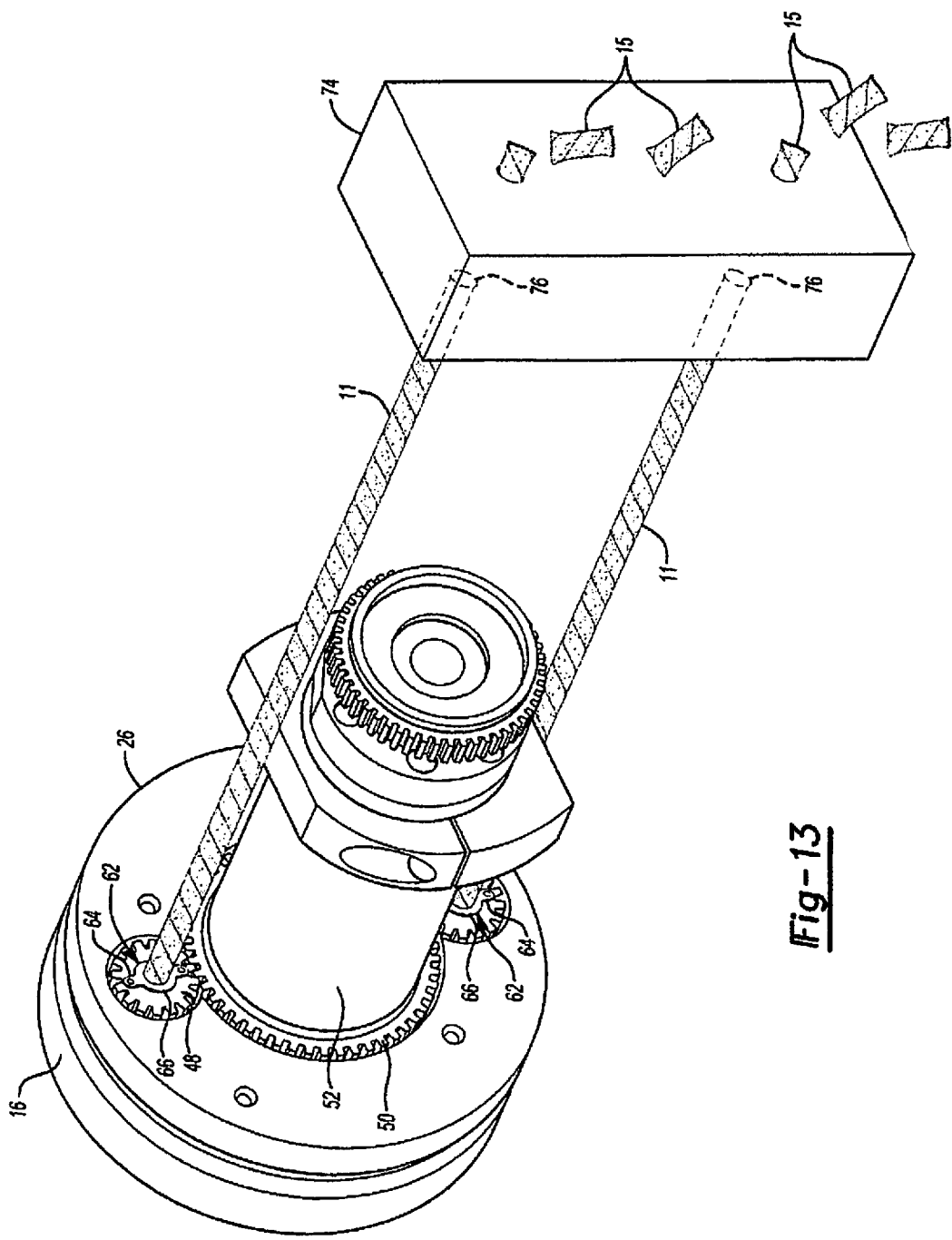
FIG. 13 is a partial perspective view of the second exemplary shaping assembly showing a spiral shaped stream of food mass being feed to a crimper.

As seen in FIGS. 8 and 9, the shaping tool 36 may include a plate portion 62 that is O-shaped and has an outer plate periphery 66 and an inner plate periphery 68. While the exemplary embodiment the plate portion 66 is O-shaped, the plate portion 66 may be any shape known in the art. The inner plate periphery 68 defines a plate opening 70 that overlies the aperture exit 32. The stream of food mass 10 is fed from the aperture exit 32 and through the plate opening 70. The plate portion 62 may include at least one support portion 64 that extends outwardly from the outer plate periphery 66. The support portion 64 defines a support opening 72 that is capable of receiving a securing mechanism, such as a pin or screw, to secure the plate portion 62 to the shaping assembly 14. In the preferred embodiment, the plate portion 62 is secured to a satellite gear 48 such that the plate portion 62 rotates with the satellite gear 48 in operation.

As seen in FIG. 8, the slicing blade 38 extends across the plate opening 70 with the blade thickness $t_b$ extending axially along the aperture axis 40 to slice the axially fed stream of food mass 10 into a plurality of food mass portions. It should be appreciated that the plurality of food mass portions results from a single rope of stream of food mass 10 being sliced by the slicing blade 38 as the stream of food mass 10 is fed through the slicing blade 38. In the preferred embodiment, the plurality of food mass portions are equally sized.

As the plate portion 62 and the slicing blade 38 disposed within the plate opening 70 are rotated, the plurality of food mass portions are spun into the spiral shaped stream of food mass 11. When a plurality of slicing blades 38 are used, as seen in FIG. 9, the slicing blades 38 may be spaced equally about the inner plate periphery 68 of the plate portion 62 to slice the stream of food mass 10 into a plurality of equally sized food mass portions. In this alternative embodiment, the plurality of slicing blades 38 intersect or engage each other at the center of the plate opening 70.

Figure 5:
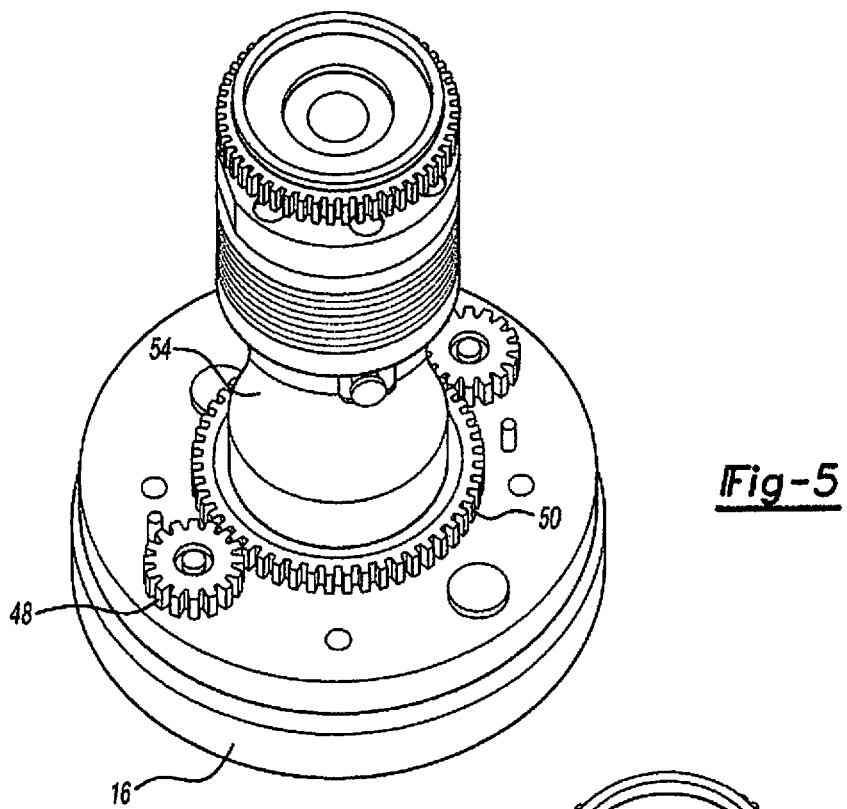
FIG. 5 is a first perspective view of the exemplary shaping assembly wherein a shaping tool supporting plate has been removed.
Figure 6:
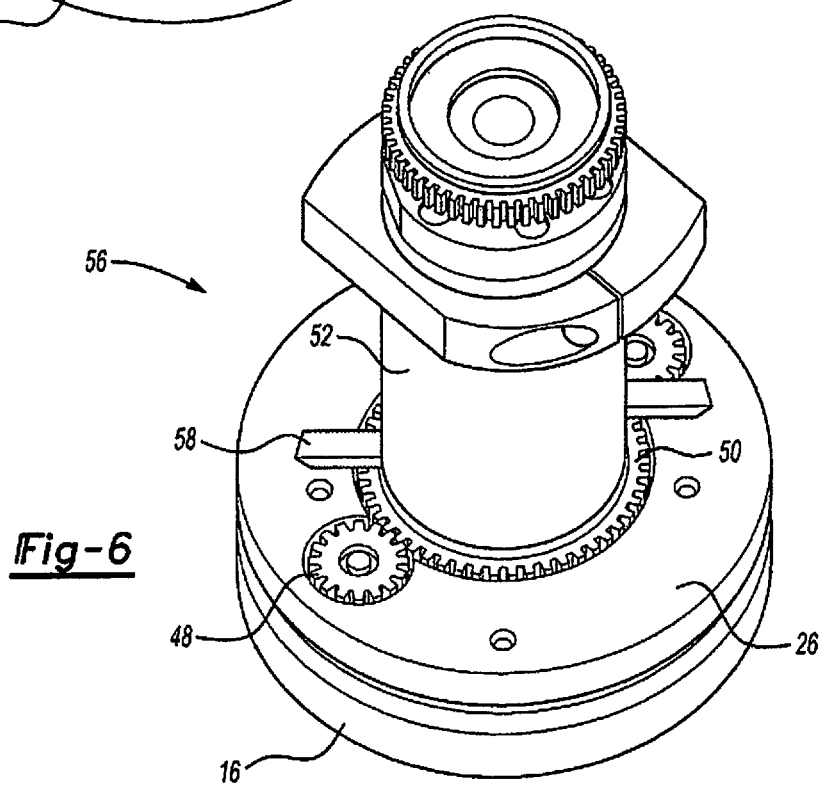
FIG. 6 is a second perspective view of the exemplary shaping assembly with the shaping tool supporting plate.
Figure 7:
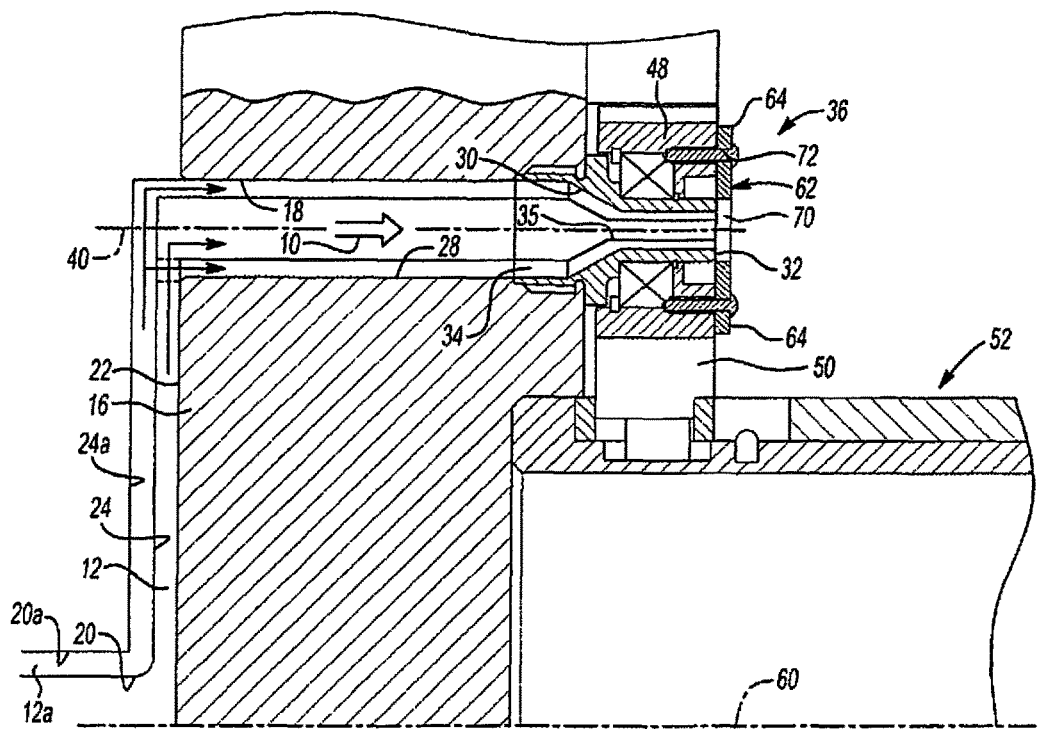
FIG. 7 is a cross-sectional view of a shaping assembly having a shaping tool according to a second exemplary embodiment of the subject invention.

The shaping tool 36 is fixed to a satellite gear 48. The shaping tool 36 is releasably fixed to the gear 48 such that the shaping tool 36 can be replaced as required. The exemplary shaping tool 36 is rotated about the axis 40 by the cooperation between the satellite gear 48, a primary or sun gear 50, a spindle 52, and a motor 54 (shown in FIG. 5). The motor 54 rotates the spindle 52. The spindle 52 and the primary gear 50 are fixed together for concurrent rotation with one another about an axis 60 or spindle axis 60. The primary gear 50 and the satellite gear 48 are engaged for reciprocating rotation with respect to one another. In addition, the primary gear 50 and the satellite gear 48 may be engaged for any rotation with respect to one another.

The plates 16 and 26 include a plurality of exit ports similar to exit port 18; the exit ports being arrayed around the axis 60.

The arrangement and operation of the shaping tool 36 results in the food mass 10 being curled, spiraled, and/or helical shaped downstream of the shaping tool 36. The speed of rotation of the shaping tool 36 about the axis 40 can be varied to vary the extent or degree of curling. In another words, the relative tightness of the helix can be varied by varying the speed of rotation of the shaping tool 36. Also, the speed at which the food mass 10 exits the exit 32 can be varied in combination with varying the speed of rotation of the shaping tool 36 to vary the degree of curling.

The shaping assembly 14 of the exemplary embodiment of the invention includes a cutter 56 to separate the stream of the food mass 10 into discrete food pieces 15. The cutter 56 can include one or more blades 58 rotating about the axis 60. The axis 60 the exemplary embodiment of the invention is the center axis of the extruder 12 and is spaced from and parallel to the axis 40. The cutter 56 is fixed with respect to the gear 50 and the spindle 52 for concurrent rotation. The speed of rotation of the cutter 56 about the axis 60 can be varied relative to the speed of rotation of the shaping tool 36 by modifying the gear teeth, or gear ratio, of the gears 48 and 50.

In addition to the cutter 56, a crimping apparatus 74 may be used to sever the discrete spiral shaped food products 15 from the stream of food mass 10. The crimping apparatus 74 may be used to separate the spiral shaped stream of food mass 11 into the discrete spiral shaped food products 15. That is, the crimping apparatus 74 pinches and cuts the spiral shaped stream of food mass 11 into the discrete spiral shaped food product 15. In the exemplary embodiment, the crimping apparatus 74 is spaced from the shaping tool. The crimping apparatus is separate and distinct from the shaping assembly 14.

In the exemplary embodiment, the crimping apparatus 74 includes at least one receiving port 76 that is in communication with the aperture exit 32 of the aperture 28. The receiving port 76 receives the spiral shaped stream of food mass 11 from the shaping tool 36 to separate, pinch or cut the spiral shaped stream of food mass 11 into the discrete spiral shaped food product 15.

While the crimping apparatus 74 may include a single receiving port 76 that corresponds to a single aperture exit 32 in the shaping tool 36, the crimping apparatus 74 in the preferred embodiment includes a plurality of receiving ports 76. If a plurality of receiving ports 76 are utilized, each one of the plurality of receiving ports 76 is in communication with one of the aperture exits 32 of the plurality of apertures 28. That is, each of the receiving ports 76 corresponds to an aperture exit 32 to receive the spiral shaped stream of food mass 11 from the corresponding aperture 28 and separate this spiral shaped stream of food mass 11 into the discrete spiral shaped food products 15.

In the exemplary embodiment, the crimping apparatus 74 may be any crimper or cutter known in the art, including, but not limited to a cereal crimper.

Thus, a planetary coupling arrangement is defined between the gears 48, 50 to facilitate rotation between the cutting blade 58 and the shaping blade 38. Embodiments of the invention can include a plurality of shaping blades 38 and a plurality of cutting blades 58. The planetary coupling arrangement allows for a compact arrangement for a plurality of food streams exiting a plurality of exit ports.

The coupling arrangement engages the shaping tool 36 to facilitate rotation of the slicing blade 38 to spin the plurality of food mass portions into a spiral shaped stream of food mass 11. The coupling arrangement includes a spindle 52 that is centered on a spindle axis 60. The coupling arrangement engages both the shaping tool and the spindle 52 to facilitate rotation between the shaping tool and the spindle 52 as the spindle 52 is rotated. The spindle 52 may be rotated by a motor. The primary gear 50 is centered on the spindle axis 60 and may be fixed to the spindle 52 to rotate with the spindle 52 about the spindle axis 60. The satellite gear 48 is centered on the aperture axis 40 and engages the primary gear 50 to rotate with the primary gear 50 and about the aperture axis 40. When a plurality of apertures 28 are disposed in the die, a plurality of satellite gears 48 are used. Each of the aperture exits 32 has a satellite gear 48 that is disposed about the aperture 28 to rotate a slicing blade 38 secured thereto over the aperture exit 32 to slice the stream of food mass 10 into a plurality of food mass portions and simultaneously rotate the plurality of food mass portions to form the spiral shaped food mass 10.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What can be claimed is:

1. A method for producing a substantially spiral shaped food product comprising:
   moving a stream of food mass through at least one aperture centered on an aperture axis, the stream of food mass including a first food mass surrounded by a second food mass, the first and second food masses centered on the aperture axis;
   moving the stream of food mass out of at least one aperture exit;
   moving the stream of food mass through a plate opening disposed over the at least one aperture exit, the plate opening defined by an inner plate periphery of a plate portion of at least one shaping tool;
   rotating at least one slicing blade of the at least one shaping tool about the aperture axis to slice the stream of food mass along the aperture axis into a plurality of sliced food mass portions, the at least one slicing blade fixedly connected to the plate portion on opposing sides of the inner plate periphery and also disposed over at least a portion of the at least one aperture exit and extending axially along the aperture axis; and
   engaging the at least one shaping tool to a coupling arrangement to rotate the at least one slicing blade and spin the plurality of sliced food mass portions into a spiral shaped stream of food mass, wherein the at least one slicing blade simultaneously slices and spins the stream of food mass to create the spiral shaped stream of food mass.

2. The method of claim 1 wherein the at least one slicing blade comprises a plurality of slicing blades.

3. The method of claim 1 wherein the plate portion is 0-shaped.

4. The method of claim 1 further comprising the step of rotating a cutter having a cutting blade about a cutter axis being spaced from the aperture axis to intermittently pass across the aperture during rotation and separate the spiral shaped stream of food mass into a discrete spiral shaped food product.

5. The method of claim 4 further comprising the step of engaging the at least one shaping tool and the cutter through a planetary coupling arrangement to facilitate reciprocating rotation between the cutting blade and the at least one slicing blade.

6. The method of claim 5 further comprising the step of concurrently rotating the cutting blade about the cutter axis and the at least one slicing blade about the aperture axis.

7. The method of claim 6 further comprising the step of varying a speed of rotation of the cutter about the cutter axis and the at least one slicing blade about the aperture axis to vary a degree of a spiral of the spiral shaped stream of food mass.

8. The method of claim 7 further comprising the step of varying a gear ratio of the planetary coupling arrangement to vary the degree of the spiral of the spiral shaped stream of food mass.

9. The method of claim 8 further comprising the step of arraying a plurality of apertures about the cutter axis, each of the plurality of apertures being centered on a center axis.

10. The method of claim 9 wherein the step of disposing the at least one slicing blade is further defined as disposing the at least one slicing blade over at least a portion of an aperture at each of the plurality of apertures.

11. The method of claim 10 wherein the step of moving a stream of food mass is further defined as moving the stream of food mass out of each of the plurality of apertures and forming a plurality of streams of food mass.

12. The method of claim 11 wherein the step of rotating the at least one slicing blade is further defined as rotating each of the at least one slicing blades disposed about the center axis of each of the plurality of apertures to shape the plurality of streams of food mass into a plurality of spiral shaped streams of food mass.

13. The method of claim 12 wherein the step of rotating the cutter is further defined as rotating a plurality of cutters each having at least one cutting blade about a plurality of cutter axes each being spaced from the center axis of each of the plurality of apertures to intermittently pass across each of the plurality of apertures during rotation and separate the plurality of spiral shaped streams of food mass into a plurality of discrete spiral shaped food products.

14. The method of claim 1 further comprising the step of varying a rate of movement of the stream of food mass out of the at least one aperture exit to vary a degree of a spiral of the spiral shaped stream of food mass.

15. The method of claim 1 wherein the plate portion includes at least one support portion extending outwardly from an outer plate periphery of the plate portion and defining a support opening for receiving a securing mechanism to secure the plate portion to the at least one shaping tool.

16. The method of claim 1 wherein the at least one slicing blade extends across the plate opening and has a blade thickness extending axially along the aperture axis for slicing the stream of food mass into the plurality of sliced food mass portions and wherein the at least one slicing blade rotates to spin the plurality of sliced food mass portions into the spiral shaped stream of food mass.

17. The method of claim 1 wherein the die defines a plurality of apertures arrayed about a spindle axis, each aperture of the plurality of apertures being centered on a corresponding aperture axis.

18. The method of claim 17 further comprising crimping each of the spiral shaped streams of food mass with a crimping apparatus, the crimping apparatus having a plurality of receiving ports, each receiving port of the plurality of receiving ports in communication with an exit of one of the plurality of apertures for receiving the spiral shaped stream of food mass from the corresponding aperture for separating the spiral shaped stream of food mass into a discrete spiral shaped food product.

19. The method of claim 1 further comprising crimping the spiral shaped stream of food mass with a crimping apparatus to separate the spiral shaped stream of food mass into a discrete spiral shaped food product.

20. The method of claim 19 wherein the crimping apparatus is spaced from the at least one shaping tool.

21. The method of claim 19 wherein crimping the spiral shaped stream of food mass includes pinching the spiral shaped stream of food mass and cutting the spiral shaped stream of food mass.

22. The method of claim 1 further comprising:
moving the first food mass through a first channel centered on the aperture axis; and
moving the second food mass through a second channel centered on the aperture axis, the second channel concentrically disposed about the first channel.

* * * * *